United States Patent [19]
Liebscher et al.

[11] 4,098,424
[45] Jul. 4, 1978

[54] TRANSPORT CONTAINER

[75] Inventors: Günther Liebscher; Günter Christ, both of Wiesbaden, Fed. Rep. of Germany

[73] Assignee: Lermer GmbH, Wiesbaden, Fed. Rep. of Germany

[21] Appl. No.: 755,178

[22] Filed: Dec. 29, 1976

[30] Foreign Application Priority Data

Sep. 29, 1976 [DE] Fed. Rep. of Germany ....... 2643859

[51] Int. Cl.² ............ B65D 7/00; B65D 7/24; B65J 1/02
[52] U.S. Cl. .................. 220/4 F; 220/1.5; 220/7; 292/140
[58] Field of Search .......... 220/7, 1.5, 4 R, 4 F, 220/73, 75, 76; 292/140, 138, 170

[56] References Cited
U.S. PATENT DOCUMENTS

| 1,434,373 | 11/1922 | Crompton et al. | 292/170 |
| 2,521,279 | 9/1950 | Becker | 220/4 F |
| 2,757,032 | 7/1956 | Stieglitz | 292/140 X |
| 3,040,925 | 6/1962 | Mills | 220/4 F X |
| 3,955,702 | 5/1976 | Lundy | 220/4 F |

Primary Examiner—William Price
Assistant Examiner—Steven M. Pollard
Attorney, Agent, or Firm—W. G. Fasse; W. W. Roberts

[57] ABSTRACT

A transport container especially suitable to be supported on a cart or trolley, and also suitable for use in an aircraft, if desired, is constructed as a parallelepiped. Two oppositely located doors are connected by hinges to a frame structure. The hinges form part of the frame structure and allow the doors to open through an angle of 270°. Corner braces having mutually perpendicular tenons mate with tubular metal stock such as sectional rods to form the frame of the container. The metal rods have U-rails for the mounting of wall, floor, door, and cover plates. A door locking mechanism is located in a hollow chamber of a door member or stile. The locking mechanism includes an interconnection of a sliding bar and two lock bolts. The rotation of a door handle actuates the lock bolts which retract into the stile for opening the door.

14 Claims, 11 Drawing Figures

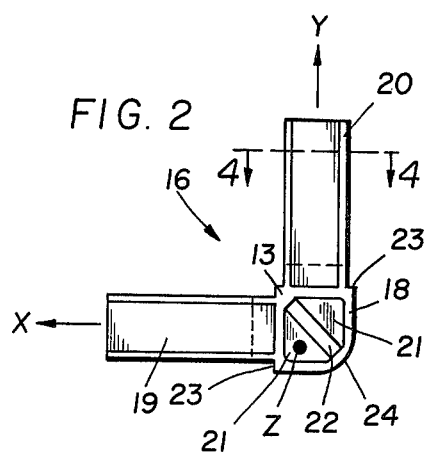
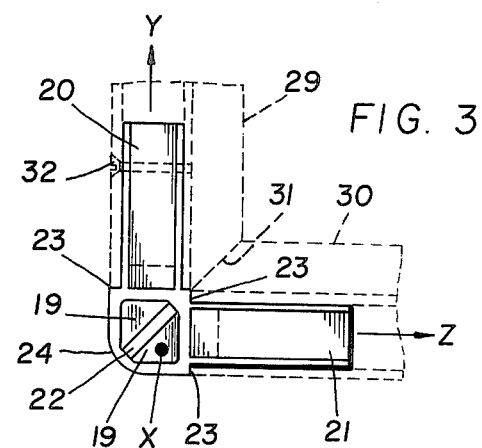
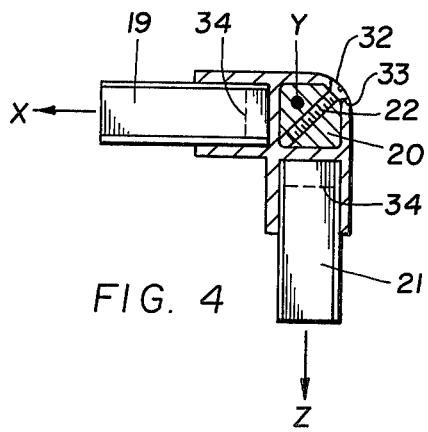
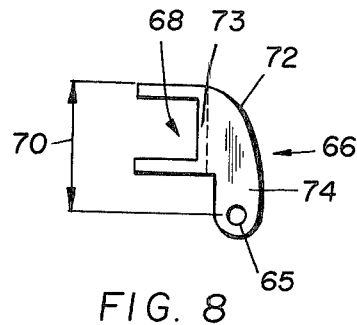
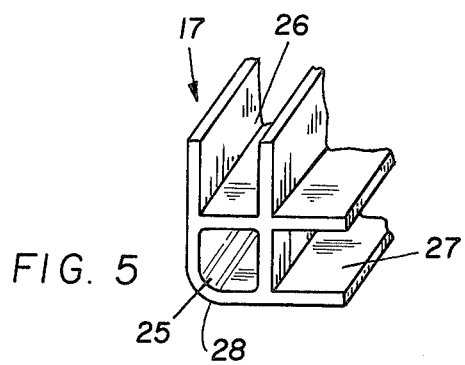
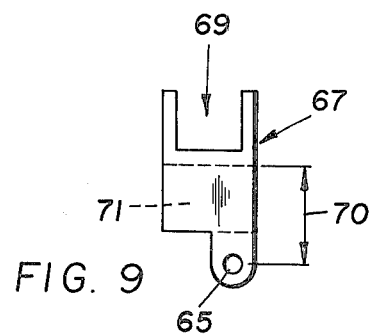
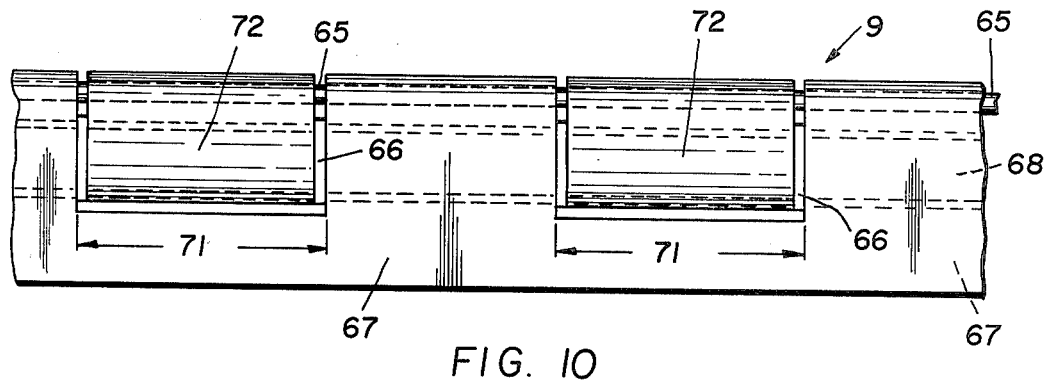

TRANSPORT CONTAINER

BACKGROUND OF THE INVENTION

The invention relates to containers constructed to meet specific requirements regarding size, strength, mechanical construction, and the like. Especially containers used for the air transport of goods must meet stringent requirements. Such air cargo containers must be capable of sustaining acceleration forces up to twelve times the force of gravity without being damaged. These transport containers may be used, for example, to carry food for aircraft passengers. The contents of the containers should preferably be accessible from the front and back for the efficient removal of the content simultaneously from both ends.

A sandwich type construction of aluminum hardfoam aluminum is used for the doors and side walls of transport containers according to the prior art. A supporting framework provides the required strength and stability for containers with such sandwich type wall and door constructions. The same requirements apply to containers having doors on their sides, containers which are loaded from the top, so called open top containers, and containers substantially without side panels, so called "flats".

The corner and edge connections of the frame of the containers must be able to withstand the expected stresses, such as those resulting form the above mentioned acceleration forces. The structural features determine the economy of such transport containers. Welding has been used in the construction of some containers. Other container constructions employ corner or edge elements having a number of extensions, such as pins, or tenons fitting into connecting tubes, or rails, and connected by securing elements. Such structures are known from the metal aircraft manufacture. The tensile and compressive forces which act on the corners are taken up by the securing elements themselves, for example, by cotter pins, rivets, screws, or the like. Thus, friction between the parts to be interlocked to form the containers is not utilized in the prior art.

Metal adhesives are also used in container constructions of the prior art. These metal adhesives have the disadvantage that connections are difficult to loosen when a part must be exchanged, or repaired. The aging of the metal adhesives is another prior art disadvantage also limiting the use of adhesives in the construction of containers.

As explained above, a transport container of this type often has two doors located on opposite sides of the container for simultaneous opening and maximum accessability. Thus, the frame of the remaining four container walls must be stable even when the doors are opened at the same time. Both the hinges and the striking sides of the doors are subject to substantial stresses since these connections between the frame and the doors proper are subject to all the effective forces including the loads of the container content, which definitely must not be spilled.

Prior art constructions of the hinges require high installation expenditures, especially due to the piano type of hinges used heretofore. Another disadvantage of previously known hinges is that a damaged door required time-consuming repairs and cleaning was difficult due to the delicate structure of the hinge elements.

The inaccurate final opening angle of previously known hinges often results in damaged doors and walls calling for frequent repairs.

OBJECTS OF THE INVENTION

In view of the foregoing, it is the aim of the invention to achieve the following objects, singly or in combination:

to provide a parallelepiped container which is especially useful for the storage, transportation, and distribution of goods, particularly in an aircraft during flight;

to provide a transport container which allows easy and rapid access to its contents and which is especially suited to be equipped with rollers or to be supported on a cart or trolley;

to provide a container which is capable of safely withstanding substantial acceleration forces, large stresses, shocks, accelerations, and impact forces, as well as continuously varying loads;

to provide a container wherein the corner connections of the supporting framework employ frictional wedging forces to safely withstand the impact and continuously varying loads including threshold loads transmitted by the connecting rods, at the same time minimizing the net weight of the framework;

to provide a container which prevents its contents from escaping due to impact forces, shocks, or any other unintentionally applied forces;

to provide a container that meets all requirements for use by flight attendants in passenger aircrafts;

to provide a container with doors which may be opened through an angle of exactly 270°, thereby damaging neither the doors nor the adjacent walls;

to provide a container construction which is stable even when two opposing doors are opened simultaneously;

to provide a container in which the wall plates, and the like, may be easily replaced when damaged, or exchanged when desired;

to provide a container which will not damage surrounding areas when in use;

to provide a container with doors including a built-in bolt locking mechanism which offers optimal safety;

to provide a container framework suitable for installing lightweight sandwich type wall panels;

to provide a container having hinges with relatively large cooperating elements, as compared to piano type hinges, for minimizing the possibility that deposits of dirt or foreign particles might hinder operation of the hinges, thereby promoting a long and trouble-free operation; and to provide a container structure in which the assembly and disassembly of all parts including frames, corners, locks, doors, hinges, walls and any other elements are easily and rapidly accomplished without special tools so that repairs and replacement may be economically performed.

SUMMARY OF THE INVENTION

According to the invention, a container having a parallelepiped form, is constructed for general use but especially for use in aircraft, and for use as a rolling container which either has its own rollers or which may be attached to a trolley or cart.

In a preferred embodiment of the invention, two doors are located in opposite, parallel, vertical planes of the parallelepiped container. The frame of the container comprises metal connecting rods or tubular members of the so-called section type, for example, extruded aluminum, interconnected by metal corner braces. The corner braces have a central head with defined stop shoulders and a number of arms, or tenons. The orthogonal tenons extend outward from the strike head of which there may be two or more. The tenons of the corner braces fit into a tubular portion of the connecting rods. These rods and braces are interconnected to form rigid edges and corners.

According to a preferred embodiment, a diagonal, longitudinal slot bisects almost the entire length of a tenon from its free end to said stop shoulders. The slotted tenon of a corner brace is inserted into the tubular end portion of a connecting rod and a wedging means such as a screw extending through the wall of the rod and into the slot provides a wedging connection between the rod and tenon.

The screw is inserted through a hole in the tubular end portion of the metal rod. The screw is wedged into the slot of the tenon inside the rod, whereby the tenon is spread apart to generate friction contact which secures the tenon and the connecting rod to each other. Withdrawing the wedging element removes the pressure of the tenon against the inner wall of the connecting rod, whereby the tenon and metal rod may be easily disconnected. Rails having a U-profile are formed on the connecting rods. Each connecting rod has two U-rails positioned at right angles to each other with the opening of the U-rail extending outwardly from the tubular portion of the connecting rod, whereby a few screws secure wall panels to the U-rails. The U-rails are mitered at the corners to provide a snug interconnection. The U-rail rods and the corner braces assure an easy assembly and disassembly of the doors and the walls of the transport container, while simultaneously assuring a very rigid structure.

In a preferred embodiment, a door panel is mounted in a U-rail forming one edge of the door or the so-called door stile. The frame forcing the door stile forms the door stop. The U-rail with the door stile also has a hollow chamber for the locking mechanism of the door. Another advantage is that this configuration is its minimal weight combined with the required stiffness or strength of the stile.

The locking mechanism has the advantage that it is made up of simple parts which are easily manufactured and assembled. Turning a handle moves a slidable bar with specially shaped end formations or cams. Two lock bolts or latches are moved in and out of the door stile by the motion of the slidable bar and its cams. The movement of the lock bolts is perpendicular to the movement of the slidable bar due to the cam end formations of the slidable bar.

The lock bolts extend perpendicularly relative to the door stop, and may, for example, engage holes in the U-rail of a connecting rod, whereby the U-rail is part of the support frame of the container. The lock bolts retract into the door stile when they are in the unlocked position.

A hinge which has a precise angle of rotation connects the door to a side wall. The 270° final opening angle of the door is determined by the construction of the hinge. A well-defined rotation range for the hinge has the advantage that it reduces the danger of possible damage to the hinge, door, and walls when the door is opened or closed. The hinge comprises a movable hinge part, an immovable hinge part, and a hinge pin. The hinges preferably have U-rails formed on continuous bars. These bars are parallel to the axis of the hinge pin and also extend in parallel to the edges of the door and wall panels. The door and wall panels are mounted in the U-rails of the hinge assembly.

The two hinge parts are formed by using a rectangular base profile. The hinge parts are partitioned according to the maximum dimension of a base profile. The rectangular base profiles are torsionally rigid. Shoulders are constructed on the hinge partitions on the continuous bars. The shoulders of the movable and immovable hinge parts form the bearing for the hinge pin. The shoulders of the hinge parts are rounded. The movable hinge part, in which the door plate is mounted, is rounded fom the U-rail to the shoulder. The rounded edges minimize any possible danger of damage to areas surrounding the container. Even when the doors are opened, or when the position of the rolling container changes due to flight conditions, minimal damage is caused by the container. The base profile of the immovable hinge part may be constructed with drill holes in its longitudinal direction. Connection elements, for instance, the tenon of a corner brace, may be inserted into these holes. Such interconnections permit the use of a second wall-door combination, for example, where a container is partitioned and a respectively divided door is required.

BRIEF FIGURE DESCRIPTION

In order that the invention may be clearly understood, it will now be described, by way of example, with reference to the accompanying drawings, wherein:

FIG. 2 is a side view of a corner brace used in the supporting framework of a container, in which the Z-axis of a three dimensional rectangular coordinate system extends toward the observer;

FIG. 3 is a side view of the corner brace of FIG. 2 rotated about 90° about the Y-axis, with dotted lines showing the manner in which two connecting rods fit together on the arms of the corner brace;

FIG. 4 is a section of a connecting rod installed on an arm of the corner brace of FIG. 2, along the line 4—4 in FIG. 2, the section extending perpendicularly to the Y-axis and parallel to the plane defined by the X and Z-axes and through a wedging screw;

FIG. 5 is a partial, perspective view of the connecting rods of FIG. 4, indicating its tubular portion and the U-rails formed at right angles relative to each other;

FIG. 8 is an end view of a movable hinge part;

FIG. 9 is an end view of an immovable hinge part not to the same scale as in FIG. 8;

FIG. 10 is a rear view of the operatively assembled movable and immovable hinge parts showing the partition and meshing of the hinge parts.

DETAILED DESCRIPTION OF PREFERRED EXAMPLE EMBODIMENTS

Figure 1:
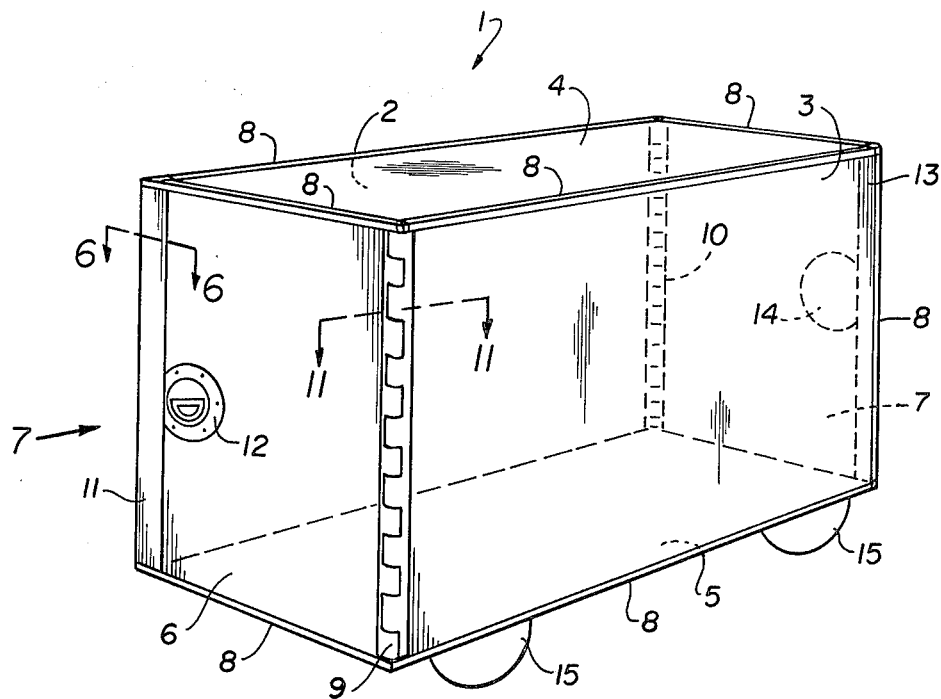
FIG. 1 shows a perspective view, on a reduced scale, of a rectangular parallelepiped container construction, according to the invention.

FIG. 1 shows a transport container 1 according to the invention. The container 1 has side panels 2 and 3 extending in parallel to each other. A top 4 extends in parallel to a bottom 5. A front door 6 extends in parallel to a rear door 7. The side panels 2 and 3 and the top panel 4 as well as the bottom panel 5 are interconnected by a frame structure 8 as will be described in more detail below.

The front door 6 is hinged to a vertical edge of the container by a first hinge 9. The rear door 7 is secured to an upright edge by a second hinge 10. Both the hinges 9 and 10 are shown in a somewhat simplified manner, not necessarily representing the exact structure of the hinge according to the invention which will be described below with reference to FIGS. 8-11.

The hinges 9 and 10 are arranged at diagonally opposite corners of the container. However, this is not necessary, but merely convenient because the present door may be opened to extend in parallel to the respective side panels 2 and 3, thus, if the doors 6 and 7 fold against separate side panels they will not interfere with each other. The front door 6 has a door stile 11 and an opening handle 12. Similarly, the rear door 7 has a door stile 13 and an opening handle 14.

The entire container may be supported by a cart or trolley with rollers 15, the details of which are not part of the present invention.

FIGS. 2, 3, 4 and 5 illustrate the elements which constitute the present frame structure 8 which may comprise a plurality of corner brace elements 16, shown in FIG. 2, and a number of sectional connecting rods 17 shown in FIG. 5. Each corner brace element 16 has a head portion 18 from which three arms 19, 20 and 21 extend. Each arm is provided with a slot 22 which extends axially and diagonally through its respective arm until it reaches a suitable depth near a shoulder 23. The shoulders 23 are located where the arms merge into the head 18 proper.

The arms 19, 20 and 21 extend in the directions X, Y, and Z forming a rectangular coordinate system. The outwardly facing edge 24 of each head 18 is rounded so as to minimize any possibilities of injury.

The sectional connecting rod 17, shown in FIG. 5 is, for example, an extruded aluminum rod which forms a recess 25 and two U-channels 26 and 27. The outwardly facing edge 28 of the extruded sectional rod 17 is also rounded to merge smoothly into the rounded edge 24 of the head 18.

The inner edge of the recess 25 is also somewhat rounded so that the rounded edges of the arms 19, 20 and 21 fit smoothly into a recess 25. FIG. 3 shows in phantom lines two connecting sections or rods 29 and 30 properly mitered in the corner 31. As mentioned, the arms 19, 20, and 21 fit snugly into the respective recesses 25 and the edges of the section 17 surrounding the recess 25 abut against a shoulder 23 of the head 18.

The sections 29 and 30 are connected to the respective arms 20 and 21 by means of screws 32 extending into the slots 22 as best seen in FIG. 4. The screw heads may be counter sunk as shown at 33 in FIG. 4. Incidentally, FIG. 4 is a section along the section line 4—4 shown in FIG. 2, whereby the arms 19 and 21 now extend in the plane of the drawing, whereas the leg 20 extends perpendicularly to the plane of the drawing. Dashed lines 34 indicate the depth of the slots 22.

The frame structure 8 is assembled from the elements illustrated in FIGS. 2 to 5. Each of the corners will include one of the corner brace elements 16. One of the arms 19, 20 or 21 will fit into the stationary portion of the hinge means as will be described in more detail with reference to FIG. 11. The hinges will also be provided with holes through which screws such as 32 extend in order to wedge one of the arms into the stationary hinge member.

Figure 6:
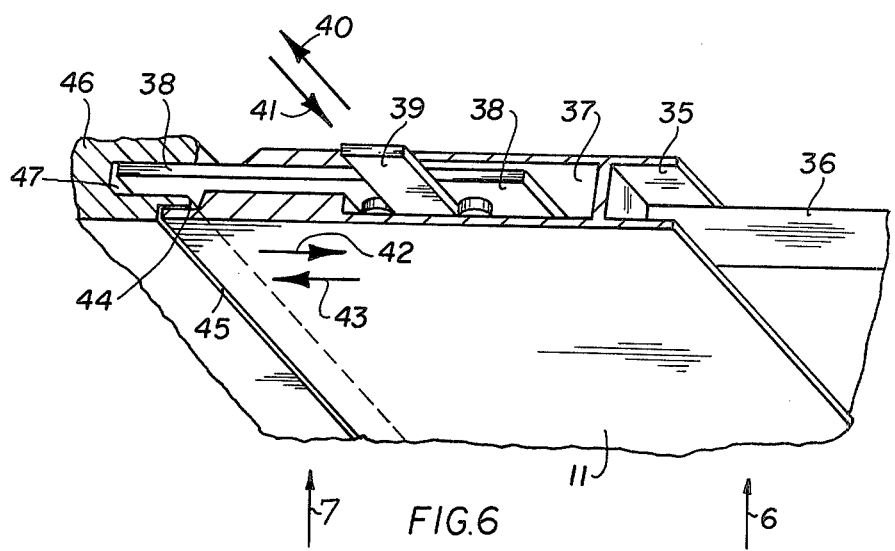
FIG. 6 is a perspective view, in partial section, showing the location of parts of the locking mechanism according to the invention in a hollow chamber of a door stile, along the line 6—6 in FIG. 1.

FIG. 6 is a perspective view, partially in section, whereby the section extends substantially along the section line 6—6 in FIG. 1 and the general view would be the same as that indicated by the arrow 7 in FIG. 1.

Figure 7:
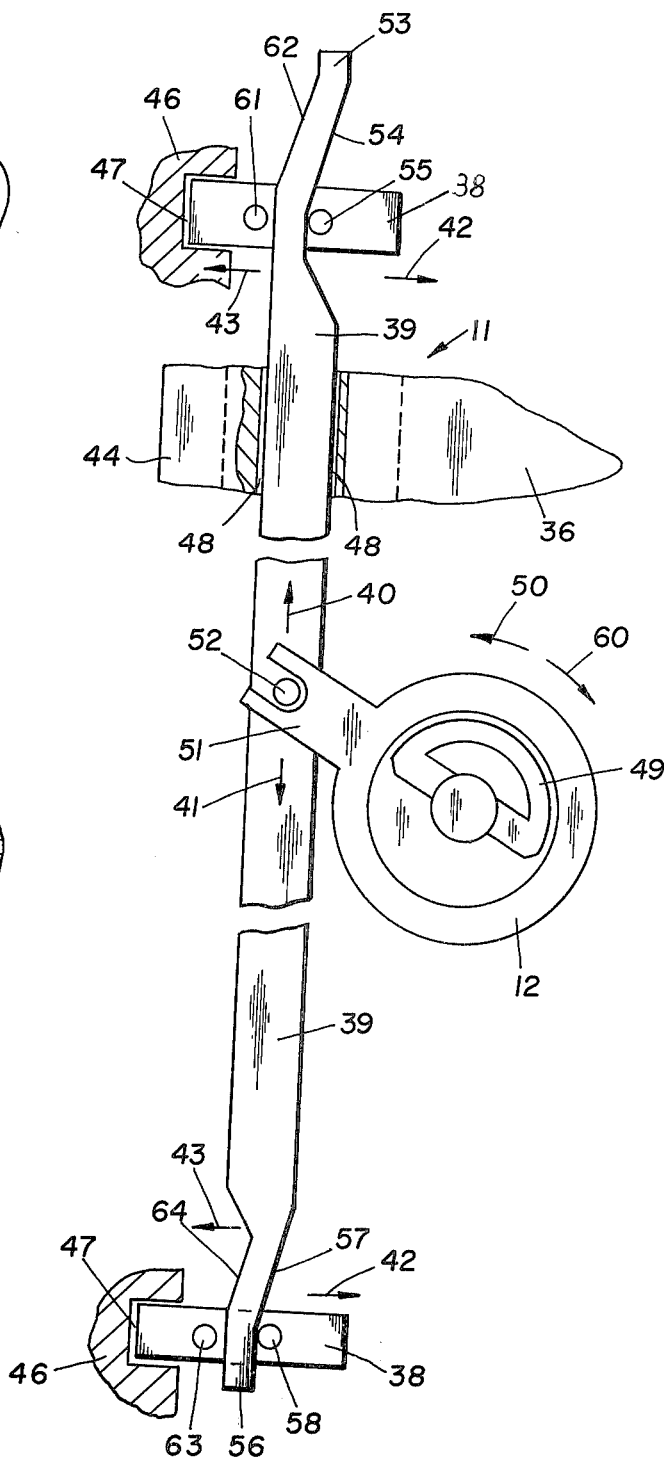
FIG. 7 is a view in the direction of the arrow 7 in FIG. 1 showing the locking mechanism in the locking position, with parts of the door stile and door stop broken away to facilitate the illustration of the operation of the locking mechanism.

FIG. 6 shows the door stile 11, the right hand edge of which is provided with a U-channel 35 into which a door panel 36 is inserted. The door stile 11 encloses a chamber 37 which houses the locking mechanism comprising, for example, two substantially horizontally movable latch bolts 38 only one of which is seen in FIG. 6, the other bolt is seen in FIG. 7, and a substantially vertically slidable locking bar 39. The locking bar 39 is movable up and down by means of the handle 12 as will be described in more detail with reference to FIG. 7 as shown by the arrows 40 and 41. The latch bolts 38 are movable horizontally back and forth in the direction of the arrows 42 and 43.

The left hand edge of the door stile 11 forms an overlap 44 which cooperates with a recess 45 in the door frame member 46 which forms part of the overall frame structure 8 and the upper and lower ends of which are provided with recesses not shown to receive an arm of the respective corner brace 16. The connection of the corner brace to the door frame member 46 would also be accomplished in the same manner as has been described above with reference to FIGS. 2, 3 and 4. The door frame member 46 is provided with recesses 47 into which the latch bolts 38 reach when the door is locked as shown in FIG. 6.

FIG. 7 is also a view in the direction of the arrow an arm in FIG. 1, but with most parts broken away to simplify the illustration of the locking mechanism. As in FIG. 6, the latch bolts 38 are also shown in the door locking position in FIG. 7. The same elements have the same reference numbers in FIGS. 6 and 7. However, the door stile 11 is only partially shown to illustrate how the vertical locking bar 39 is guided in the door stile 11. For this purpose, the door stile 11 has guide channels 48 only one of which is shown in the upper half of FIG. 7. Similarly, only those portions of the door frame member 46 are shown in FIG. 7 which illustrate the location of the recesses 47 into which the latch bolts 38 reach in the locked position of the locking mechanism.

The locking handle 12 may, for example, be provided with a fold-in pull out member 49. Rotating the handle 12 counterclockwise as indicated by the arrow 50 will unlock the door. For this purpose, the handle 12 is provided with a radially extending fork members 51 which engages a cam pin 52 rigidly secured to the slidable locking bar 39. The upper end 53 of the bar 39 has a cam surface 54 which engages a further cam pin 55 rigidly secured to the horizontally movable latch bolt 38. Similarly, the lower end 56 of the locking bar 39 is provided with a cam surface 57 which engages a cam pin 58 to move the lower latch bolt 38 in the direction of the arrow 42 in response to a counterclockwise rotation of the handle 12. As mentioned above, the upper and lower latch bolts 38 are freely movable back and forth in a horizontal direction in the chamber 37. The bar 39 is only movable up and down and when it has reached its lowermost position, the cam pins 55 and 58 will respectively engage the upper end of their caming surfaces 54 and 57.

The locking operation takes place in the reverse fashion. When the door is unlocked the fork member 51 of the handle 12 will point substantially to the lower left hand corner of FIG. 7. If the handle 12 is now rotated in the clockwise direction 60, a cam pin 61 will ride along the cam surface 62 and a cam pin 63 will ride along the cam surface 64 until these cam pins 61 and 63 reach their leftmost position as shown in FIG. 7. In view of the foregoing, it will be appreciated, that depending on the slanting angle of the cam surfaces the opening and closing operations may be reversed.

FIGS. 8, 9, 10 and 11 illustrate the hinge structure according to the invention. FIGS. 8 and 9 illustrate a view in the longitudinal direction of the journal axis 65 of the present hinge structure. FIG. 8 illustrates the movable hinge member 66 and FIG. 9 illustrates the stationary hinge member 67. Both hinge members comprise respective U-channels 68 and 69. The drawings are not shown on any particular scale. Therefore it must be appreciated that the spacing 70 from the journal axis 65 to the top of the recess 71 in the stationary hinge member 67 corresponds to the same spacing 70 in FIG. 8 again extending from the journal axis 65 to the top of the U-channel 68 in the movable hinge member 66. Thus, the bent portions 72 of the movable hinge member 66 fit into the recesses 71 of the stationary hinge member 67 as best seen in FIG. 10.

The channel portion 73 of the movable hinge member 66 extends preferably at right angles to the bent-over hinge portion 74 of the movable hinge member 66. This feature in combination with the fitting of the curved portions 72 into the recesses 71 provides a hinge structure capable of a 270° opening angle.

Figure 11:
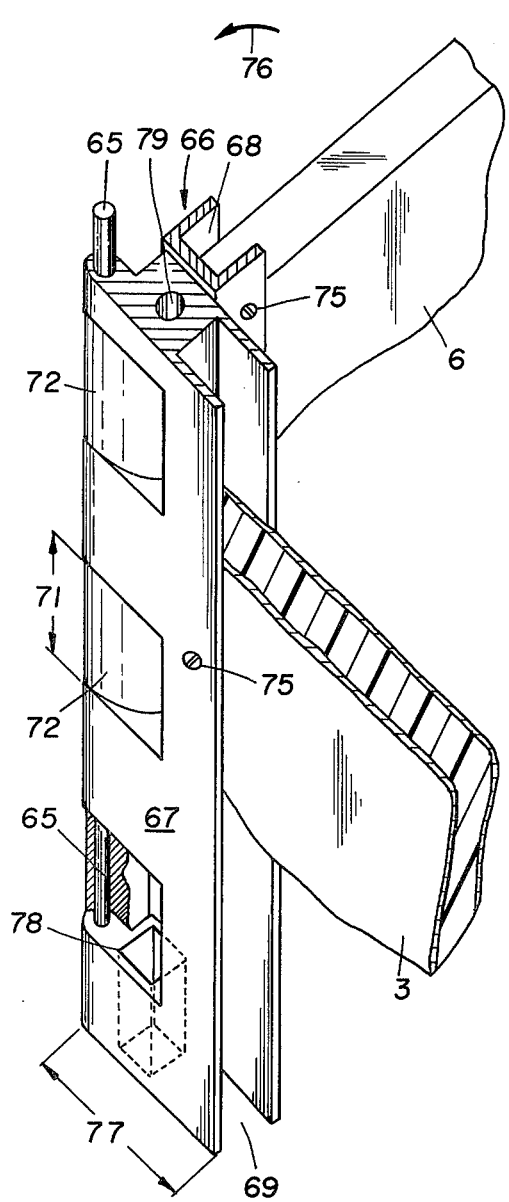
FIG. 11 is a partial, sectional and perspective view showing details of the hinge assembly, when the door is closed, whereby the section extends in a plane defined by line 11—11 in FIG. 1.

FIG. 11 illustrates the location of a hinge according to the invention in a perspective, partially sectional view along the section line 11—11 in FIG. 1. In the shown position the door panel 6 is closed extending at a right angle relative to the side wall panel 3. The door panel 6 is inserted in the U-channel 68. The side wall panel 3 is inserted in the view channel 69. These panels may be connected to the respective channel walls, for example, by means of screws 75 so that an easy replacement is assured.

In FIG. 11 the door opens in the direction of the arrow 76 and the door can be folded through a 270° angle until it extends in parallel to the side wall panel 3. The movable hinge member 66 and the stationary hinge member 67 may be manufactured from, for example, extruded aluminum stock, whereby the length 71 of the respective recesses in the stationary hinge member 67 will correspond substantially to the larger dimension 77 of the stationary hinge member 67. The rounded portions 72 of the movable hinge member 66 will preferably have a length somewhat smaller than the length 71 so as to assure a smooth relative movement between the hinge members.

In the lower left hand corner of FIG. 11 the rounded portion 72 of the movable hinge member 66 has been broken away to expose the journal axis 65 of the hinge structure and to also show a square hole 78 adapted to receive one arm of a corner brace member 16 to form the frame structure 8 into which the stationary hinge member would be integrated to form an especially rugged structure.

In an alternative embodiment, the corner brace member 16 may be provided at least with one round arm (not shown) adapted to fit into a respective hole 79 in the stationary hinge member 67 again, for the purpose of connecting the stationary hinge member into the frame structure 8. An arm of the corner brace 16 may be inserted into the holes 78 with a press fit or a screw may be used as described above, for example, with reference to screw 32.

Incidentally, the curved portion 72 of the movable hinge member 66 will have such a curvature that the movable hinge member 66 will close the recesses 71 in the closed position of the door as best seen in FIG. 11. Moreover, the curved portion 72 faces outwardly when the door is fully opened, whereby the advantage is achieved that any impacts or the like are deflected by this round or curved portion 72, thereby protecting the hinge structure proper.

Although the invention has been described with reference to specific example embodiments, it will be appreciated, that it is intended to cover all modifications and equivalents within the scope of the appended claims.

What is claimed is:

1. A container comprising frame means, wall panel means, door means operatively secured to said frame means, and locking means, said frame means comprising corner brace means including arm means, sectional connecting means, and pressure applying means, for operatively securing said sectional connecting means to said arm means of said corner brace means to form said frame means, movable hinge means and immovable hinge means, journal means operatively connecting said movable hinge means to said immovable hinge means, first connecting means operatively connecting said door means to said movable hinge means, second connecting means operatively connecting said immovable hinge means to said wall panel means, said locking means comprising actuation means and slidable latch means operatively connected to said actuation means so that a motion of said actuation means causes a respective motion of said latch means to open and lock the door means, recess means in said frame means, said latch means operatively engaging said recess means in the closed position of said door means, said hinge means comprising stop means limiting the opening angle for said door means to 270° and wherein each of said sectional connecting means comprises two U-channels (26,27) extending at a right angle to each other and a substantially closed hollow channel (25) having open ends and a wall merging into said U-channels, said U-channels having walls mitered at their ends, said arm means of said corner brace means having slots therein, said arm means fitting into said hollow channel (25), and wherein said pressure applying means comprise wedging means extending through said wall of said hollow channel and into a respective one of said slots in the corresponding arm means of the corner brace means, whereby said wedging means perform a double locking action by their wedging effect and by extending through said wall of said hollow channel into the corresponding arm means of the corner brace means.

2. The container of claim 1, wherein said arm means of said corner brace means have a given cross-section, said hollow channel having a cross-section adapted to receive the given cross-section of the arm means, said slots in said arm means extending axially in said arm means, said wedging means pressing the outer surfaces of said arm means against the corresponding inner surfaces of said hollow channel.

3. The container of claim 2, wherein said wedging means comprise screw means screwed into said slots, whereby the arm means expand under the wedging action of the screw means, said arm means having a substantially square cross-section, said slot extending axially and diagonally through the respective arm means.

4. The container of claim 1, wherein said sectional connecting means comprise profiled mounting means operatively positioned for securing said wall panel means to said sectional connecting means of said frame means.

5. The container of claim 3, wherein said profiled mounting means comprise U-profiled channel means and means securing said wall panel means in said U-profiled channel means.

6. The container of claim 1, wherein said first connecting means of the movable hinge means and said second connecting means of the immovable hinge means comprise U-channel means for securing said door means and said wall panel means respectively to said first and second connecting means.

7. The container of claim 1, wherein said movable hinge means comprise first shoulder means, said immovable hinge means comprise second shoulder means, said journal means comprising shaft means operatively connecting said first shoulder means with said second shoulder means, said first and second connecting means of said hinge means having U-channels extending at a right angle relative to each other when the hinge means are in the closed position relative to each other, said U-channels extending in parallel to each other when the hinge means are in the open position, said U-channels facing in the same direction when said hinge means are open.

8. The container of claim 7, wherein said first and second shoulder means have outwardly facing rounded surface means.

9. The container of claim 8, wherein said first shoulder means has an offset angle of 90° relative to the respective U-channel, whereby the first shoulder extends substantially in parallel to the bottom of the respective U-channel.

10. The container of claim 7, wherein said shoulder means of the movable hinge means and of said immovable hinge means are formed of substantially rectangular stock having a given height and a given width, said shoulder means having a length corresponding substantially to said given height of said rectangular stock.

11. The container of claim 10, wherein said shoulder means of the immovable hinge means further comprise recess means for operative connection to a further wall-forming door and frame means.

12. The container of claim 1, wherein said actuation means of said locking means comprises a rotatable actuating member and shift cam means for translating angular rotation of said rotatable actuating member to a linear motion of the slidable latch means.

13. The container of claim 1, wherein said corner brace means are provided with shoulder means where the arm means merge into the corner brace means proper.

14. A container having the form of a parallelepiped, especially suitable for use in an aircraft, comprising wall panel means, frame means having first and second hinging edges located at diagonally opposite ends of said container, first and second door means including door stile means, first and second hinge means mounting the respective door means to the corresponding hinging edge, each hinge means including respective movable and immovable hinge members shaped for rotation through a hinging angle of 270°, means operatively mounting said first and second door means to the corresponding movable hinge member, said mounting means extending in parallel to the axis of rotation of said movable hinge members, said frame means further comprising sectional rod means including an axial recess in each end of each rod means, and corner brace means including orthogonal arm means fitting into the respective recess, slot means extending axially in each of said arm means, wedging means extending through said sectional rod means and engaging said slot means, whereby said arm means are wedged against the inner walls of the sectional rod means, said frame means and said hinge means comprising U-channel means to hold said wall panel means, said door stile means and said hinge means comprising channel means to hold said door means, said door stile means further comprising chamber means and locking means comprising slidable bar means located in said chamber means and having a first end and a second end, first lock bolt means having cam means, second lock bolt means having cam means, actuation means causing rectilinear motion of said slidable bar means, said cam means of said first lock bolt means being operatively positioned so that the rectilinear motion of the first end of said bar means causes said first lock bolt means to move in a direction normal to said rectilinear motion, said cam means of second lock bolt means being operatively positioned so that said rectilinear motion of the second end of said slidable bar means causes said second lock bolt means to move in a direction normal to said rectilinear motion, first recess means in said frame means, second recess means in said frame means, said lock bolt means operatively engaging and disengaging their respective recess means in response to a closing and opening motion respectively of said slidable bar means.

* * * * *